United States Patent
Ramalho et al.

(10) Patent No.: US 6,999,763 B2
(45) Date of Patent: Feb. 14, 2006

(54) MULTIPLE PERSONALITY TELEPHONY DEVICES

(75) Inventors: Michael A. Ramalho, Wall Township, NJ (US); Ramanathan T. Jagadeesan, San Jose, CA (US); Bich Tu Nguyen, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 10/641,190

(22) Filed: Aug. 14, 2003

(65) Prior Publication Data

US 2005/0037746 A1 Feb. 17, 2005

(51) Int. Cl.
*H04Q 7/20* (2006.01)
(52) U.S. Cl. .............. 455/435.1; 455/432.3; 455/552.1; 455/553.1; 455/526
(58) Field of Classification Search ........... 455/462, 455/552.1, 553.1, 426, 445, 561, 417, 432, 455/435.1, 432.3, 526; 370/330, 446, 337, 370/347
See application file for complete search history.

(56) References Cited

U.S. PATENT DOCUMENTS

| | | | |
|---|---|---|---|
| 5,845,198 A | 12/1998 | Bamburak et al. ......... 455/31.1 |
| 5,953,323 A * | 9/1999 | Haartsen ..................... 370/330 |
| 6,035,193 A * | 3/2000 | Buhrmann et al. ....... 455/426.1 |
| 6,157,845 A | 12/2000 | Henry et al. ................ 455/553 |
| 6,161,008 A | 12/2000 | Lee et al. .................... 455/414 |
| 6,463,283 B1 | 10/2002 | Achour et al. .............. 455/432 |
| 6,494,762 B1 | 12/2002 | Bushmitch et al. ......... 446/268 |
| 6,681,118 B1 | 1/2004 | Raffel et al. ................ 455/552 |
| 6,757,528 B1 | 6/2004 | Cardina et al. ............. 455/404 |
| 6,766,175 B1 * | 7/2004 | Uchiyama ................... 455/462 |
| 6,768,726 B1 | 7/2004 | Dorenbosch et al. ....... 370/331 |
| 6,771,981 B1 | 8/2004 | Zalewski et al. ........... 455/557 |
| 6,829,486 B1 | 12/2004 | McKenna et al. .......... 455/464 |
| 6,850,755 B1 | 2/2005 | Allande et al. ............. 455/406 |
| 6,859,649 B1 | 2/2005 | Denenberg et al. ......... 455/406 |

* cited by examiner

*Primary Examiner*—Erika A. Gary
*Assistant Examiner*—Wayne Cai
(74) *Attorney, Agent, or Firm*—Baker Botts L.L.P.

(57) ABSTRACT

A mobile device supports concurrent registrations of different wireless personalities with one or more service provider networks. Potentially using a single wireless interface, the mobile device can register and maintain multiple personalities and monitor for notifications targeted to any one of these personalities.

25 Claims, 3 Drawing Sheets

MULTIPLE PERSONALITY TELEPHONY DEVICES

TECHNICAL FIELD OF THE INVENTION

The present invention relates in general to mobile communication systems and, more particularly, to multiple personality telephony devices within communication systems.

BACKGROUND OF THE INVENTION

Technological advances have enabled development of sophisticated communication devices. These developments include the proliferation of wireless communication devices and service providers supporting these devices with telephony infrastructure. Using contractual and technological coordination, these providers allow a subscriber to seamlessly conduct wireless communications across geographical regions using a single telephone number.

SUMMARY OF THE INVENTION

In accordance with the present invention, techniques for supporting multiple personalities within mobile communication devices are provided. According to particular embodiments, these techniques enable a wireless device having a single wireless interface component to simultaneously register with one or more service providers using multiple telephony personalities.

According to a particular embodiment, a method for accessing wireless services with a mobile device comprising identifies a first personality associated with a first wireless communication service and identifies a second personality associated with a second wireless communication service. The method detects a first wireless network associated with the first wireless communication service and detects a second wireless network associated with the second wireless communication service. The method also registers the first personality with the first wireless communication service using the first wireless network and registers the second personality with the second wireless communication service using the second wireless network. In addition, the method monitors for notifications from the first wireless network that identify the first personality during one or more occurrences of a first notification interval and monitors for notifications from the second wireless network that identify the second personality during one or more occurrences of a second notification interval.

Embodiments of the invention provide various technical advantages. These techniques may permit a single wireless device to simultaneously support registration of multiple "personalities" of a user using a single set of wireless network interface equipment. For example, a wireless device may allow a user to simultaneously register personalities for both a work phone number and a personal phone number. According to particular embodiments, wireless devices may support multiple personalities in a manner transparent to service providers. Thus wireless devices can potentially support multiple registered telephone numbers without requiring cooperation or support from service providers. However, particular embodiments may enable multiple registrations of wireless devices based upon coordination or knowledge of service providers. When such services are offered and supported by service providers, the service providers may potentially bundle offerings and increase the attractiveness of services to potential customers.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
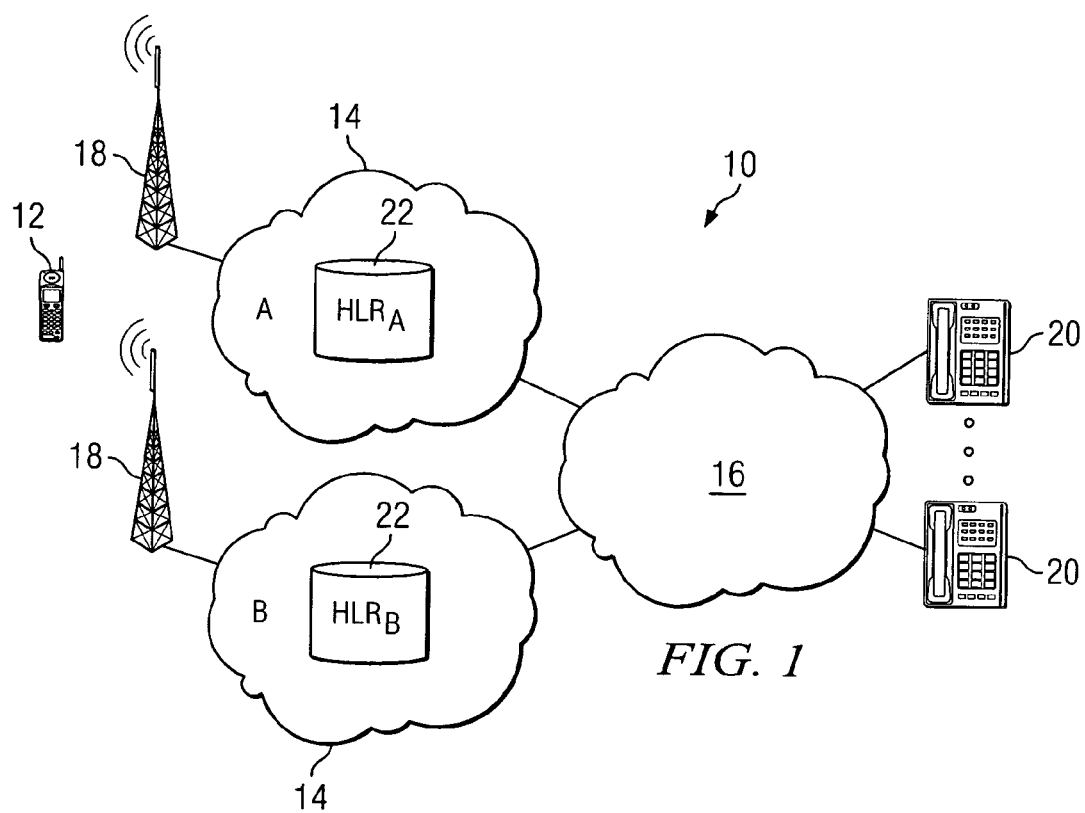
FIG. 1 illustrates a portion of a communication system that includes a mobile device operable to support multiple personalities in accordance with particular embodiments of the present invention.

FIG. 1 illustrates a portion of a communication system, indicated generally at 10, that includes a mobile device 12, wireless service providers 14, and a telephony infrastructure 16. As illustrated, system 10 also includes wireless communication stations 18 and other communication devices 20. During operation, mobile device 12 may register with and receive service from service providers 14 using wireless communications with stations 18. More specifically, mobile device 12 may simultaneously register multiple telephony personalities with one or more service providers 14 and may receive or initiate communications using any of these registered personalities.

Device 12 represents any suitable equipment, including controlling logic, that supports wireless communications. Device 12 may be, for example, a mobile phone, personal digital assistant, wireless enabled computer, or any other suitable device for providing wireless access to communication services. During operation, device 12 may register multiple telephony personalities with one or more service providers 14. Device 12 may then support incoming or outgoing communication sessions using any one of these registered personalities. According to particular embodiments, device 12 may include a single set of wireless communications equipment and may support the multiple personality registrations using this one set of wireless equipment.

Telephony infrastructure 16 represents any suitable collection and arrangement of equipment and transmission media supporting the interconnection of telephony networks. Telephony infrastructure 16 may further include any number of local service providers, network traffic carriers, or other appropriate entities. Telephony infrastructure 16 is illustrated within this embodiment to clarify a potential interconnection between multiple wireless service providers 14.

Each wireless service provider 14 represents any suitable collection and arrangement of equipment for supporting and providing wireless services to subscribers. In the embodiment illustrated, each service provider 14 includes a home location register (HLR) 22 and any number of stations 18. Service provider 14 may encompass any number of networks supporting any number of suitable protocols. For example, service provider 14 may encompass both digital and cellular wireless telephone networks. Moreover, while illustrated as a single entity within system 10, service provider 14 may include networks having different ownerships. For example, through various agreements or other appropriate arrangements, various wireless providers may arrange for subscribers to receive service using different networks at different geographic locations.

Service providers 14 use stations 18 to provide wireless communication services for subscribers. Thus each station 18 represents suitable equipment, including any appropriate controlling logic, for supporting one or more wireless links using any appropriate communication protocols. Stations 18 enable subscribers, such as mobile device 12, to access services of service providers 14. Service providers 14 offer these services based upon, for example, service agreements with subscribers. Service providers 14 may provide each subscriber with a personality. A personality reflects information such as a telephone number and a mobile device identifier associated with that telephone number. Using the mobile device 12 identified by the mobile device identifier, that subscriber may register with service provider 14 and receive wireless services. HLR 22 supports this registration process by maintaining registrations of subscribers currently accessing wireless services. For example, for each subscriber registered with service provider 14, HLR 22 may maintain information such as a telephone number, a mobile device identifier, and a current paging area for the subscriber. The paging area identifies one or more stations 18 and enables service provider 14 to quickly notify mobile device 12 of events, such as an incoming call.

As an example, consider a subscriber associated with mobile device 12 having a subscriber agreement with service provider 14 labeled A (provider A). This subscriber agreement may provide for a personality (personality A) assigned to device 12. This personality, as previously noted, will include characteristics such as an assigned telephone number or other suitable identifier. Device 12 can then register with provider A using any appropriately linked station 18. Provider A, upon registration of device 12, updates HLR A to reflect the registration of personality A. Device 12 may then make calls (as personality A) using provider A. Provider A can also receive and route calls to device 12 based upon the registration of personality A.

This described process enables the registration of a single personality (personality A) with provider A. However, device 12 provides for the simultaneous registration of multiple personalities with one or more service providers 14. To further the previous example, consider the subscriber associated with device 12 also having a subscriber agreement in place with provider B, with the subscriber agreement providing for a second personality (personality B). Personality B, like personality A, may include a telephone number or other suitable identifier. However, personality B includes an identifier different than the identifier for personality A. For example, personality A and personality B may each specify unique phone numbers. Using any station 18 appropriately linked to provider B, device 12 may register personality B. Based upon this registration, provider B can update HLR B to reflect the registration of personality B. Device 12 can then place and receive calls through provider B using personality B.

At this point, device 12 may have simultaneous registrations of both personality A and personality B. Device 12 can now permit a user to place a call using either of the registered personalities. For example, using a keypad or other appropriate selection device, a user may indicate one of the personalities and place a call using the indicated personality. Device 12 can also monitor for and accept incoming calls for either of the registered personalities. For example, device 12 may monitor for incoming pages that identify either personality A or personality B and, in response to receiving an incoming page, alert a user to the incoming telephone call.

According to particular embodiments, device 12 supports the registration of multiple personalities using a single set of wireless communications equipment. To support multiple personalities using a single wireless interface, device 12 may coordinate various wireless interactions that may be required to support each personality. According to particular embodiments, device 12 supports wireless activities such as registration, movement, and monitoring for notifications for each personality using a single wireless interface. For example, consider device 12 with personality A and personality B. When device 12 is initialized, such as at power up, device 12 may select one of these personalities and attempt to register with the appropriate service provider 14 using a wireless interface. After successful or failed registration of the first personality, device 12 may then use the wireless interface to register the other personality. Once registered, device 12 can monitor for notifications, such as incoming pages that identify either registered personality, using the wireless interface. To accomplish this, device 12 may tune its wireless interface between multiple notification channels.

The operations of the single wireless interface may be tailored to match to notification requirements or specifications of the various service providers 14 supporting the multiple personalities. According to particular embodiments, device 12 receives notifications from service providers 14 on particular paging channels. Thus, for example, each service provider 14 may establish, either statically or dynamically, a particular wireless channel for transmitting notifications to mobile device 12 and specify a particular timeslot for any potential notifications. When service provider 14 receives an incoming call identifying device 12, service provider 14 will transmit a page that identifies device 12 on the notification channel during one or more successive timeslots. Device 12 can then respond to the page to answer the call. Thus, to monitor for an incoming notification, device 12 may tune to a particular wireless channel during each occurrence of a particular timeslot.

As described, each service provider 14 may have an established notification channel and/or timeslot for transmitting notifications to device 12. The notification periods specified by each service provider 14 may, however, be different. Thus even if registered with multiple service providers 14, the particular times at which device 12 can monitor for incoming notifications may not overlap. Therefore, during operation, device 12 can retune its wireless interface between various notification channels in order to listen at appropriate times for incoming notifications. Moreover, in certain circumstances, multiple personalities registered by device 12 may share a common notification channel and/or timeslot. For example, if device 12 registers multiple personalities with a single service provider 14, device 12 may potentially monitor for notifications for each of these personalities without returning its wireless interface.

In some instances, notification periods for two or more registered personalities may overlap or completely conflict. In these situations, device 12 may alternate between the conflicting personalities, such that during each occurrence of the conflicting notification period, device 12 monitors for notifications for only one of the conflicting personalities. More detail with respect to this operation is provided below with respect to FIG. 2.

In addition to registration and notification monitoring, device 12 may also provide for mobility using its wireless interface. This mobility enables device 12 to roam geographically while maintaining one or more personality registrations. To enable this mobility, device 12 may support any suitable monitoring and re-registration processes. For example, device 12, using its wireless interface, may detect physical movement from one paging area into another paging area and, in response, may re-register one or more associated personalities to receive notifications in the new paging area.

Figure 2:
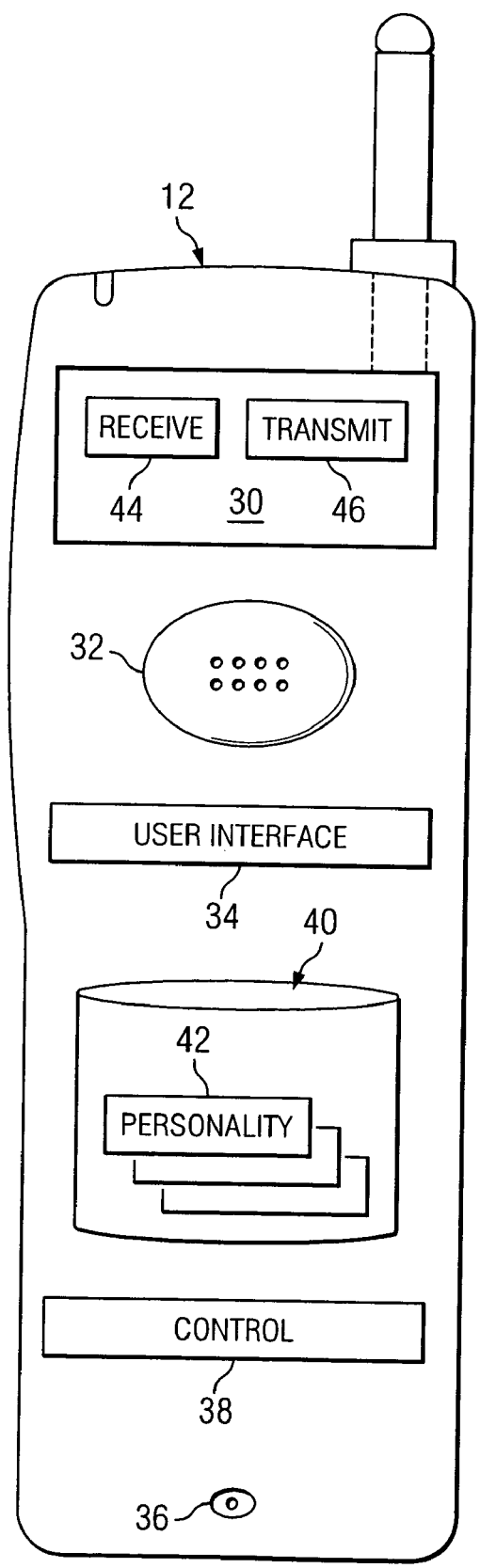
FIG. 2 is a block diagram illustrating in greater detail functional elements of an exemplary mobile device from the system.

FIG. 2 is a block diagram illustrating exemplary functional elements for device 12 that include a wireless interface 30, a speaker 32, a user interface 34, a microphone 36, a control module 38, and a memory 40. In the embodiment illustrated, memory 40 maintains information for multiple personalities 42. In general, device 12 provides wireless communication services for a user by linking to one or more service providers 14 using wireless interface 30. More specifically, device 12 supports simultaneous registration of multiple personalities 42 with one or more service providers 14.

Wireless interface 30 provides for wireless communications between device 12 and other communications equipment, such as stations 18. In the embodiment illustrated, wireless interface 30 includes a receiver 44 and a transmitter 46. Receiver 44 and transmitter 46 support, respectively, the receipt and transmission of wireless communications using any appropriate protocols and/or formats. According to particular embodiments, receiver 44 and transmitter 46 may support wireless communications with multiple service providers 14 using one or more communication protocols.

In the embodiment illustrated, device 12 includes a number of elements for interacting with users. These include speaker 32, user interface 34, and microphone 36. Speaker 32 provides for audio output to a user. Microphone 36 provides for audio input from the user. User interface 34 includes any other suitable interfacing elements, such as displays, keypads, and other suitable input or output devices. Control module 38 provides for management and control of device 12 by interacting with and controlling the operation of various elements within device 12. For example, control module 38 may access information maintained within memory 40 and control other elements to interact with users and other wireless communications equipment.

In the embodiment illustrated, memory 40 maintains multiple personalities 42. Each personality 42 includes information detailing a particular wireless identity that may be used by device 12. For example, a personality 42 may include a telephone number and a device identifier, such as a mobile equipment identifier (MEID), mobile identification number (MIN), international mobile station identifier (IMSI), or other suitable mobile equipment identifier. In certain circumstances, the information within personality 42 may reflect telephone numbers and device identifiers assigned by or resulting from a subscriber agreement with a particular service provider 14. Moreover, each personality 42 may include any other suitable information for use by device 12 in registering and receiving wireless services from service providers 14. Also, though not explicitly shown, memory 40 may maintain any other suitable data for use by device 12 during operation. For example, memory 40 may maintain software modules, object code, and/or other suitable logic for execution by other elements of device 12 during operation.

During operation, device 12 may register one or more personalities 42 with service providers 14 to provide wireless services for a user. According to particular embodiments, at startup, device 12 may identify one or more active personalities 42 and attempt to register each of these personalities 42. These active personalities 42 may be configured by users, administrators, and/or other appropriate elements within system 10. Moreover, each personality 42 may be customized to be active at particular times and/or places. For example, a selected personality 42 associated with a business telephone number may be configured to be active only during selected times of the day while another personality 42 associated with a personal number may be always active. Additionally or alternatively, personalities 42 may be configured to be active only in certain geographic areas. As yet another alternative, device 12 may treat all personalities 42 as active and attempt to register each personality 42 at startup. These examples illustrate a few of the wide array of possibilities for configuring availability of personalities 42.

During startup or at other suitable times, device 12 attempts to register each active personality 42 with an appropriate service provider 14. In embodiments in which device 12 includes a single transmitter 46, device 12 may cycle through and register each active personality 42 in turn. Thus, for example, control module 38 may identify a first active personality 42 and, using wireless interface 30, locate a network linking to the appropriate service provider 14. Once located, device 12 may register with service provider 14. Control module 38 may then select a next active personality 42 and use a similar process to register this personality 42. In this manner, device 12 can serially register each active personality 42. Once registered, a user may place a call using any one of the registered personalities 42. For example, user interface 34 may display the multiple telephone numbers available from which to place a call.

After registering, device 12 monitors for notifications received for any of the registered personalities 42. As previously discussed, each registered personality 42 may potentially require monitoring of a separate wireless channel and/or timeslot. Thus to monitor each registered personality 42, device 12 may potentially tune receiver 44 between one or more notification channels in order to monitor each channel at an appropriate time.

In certain circumstances, the notification timeslot for one registered personality 42 may conflict with the notification timeslot for another registered personality 42. For example, two registered personalities 42 may share a common timeslot but require listening on different wireless channels. To handle these conflicts, device 12 may alternate monitoring for each of the conflicting personalities 42. For example, consider two personalities 42 specifying different paging channels, yet indicating a common timeslot. During the first timeslot conflict, device 12 may monitor for notifications identifying the first conflicting personality 42, and in the second occurrence of the timeslot, device 12 may monitor for notifications indicating the second conflicting personality 42. Device 12 may monitor for these notifications by tuning between the two paging channels specified for the two conflicting personalities 42. In many networks, notifications may be repeated during multiple successive notification timeslots. Thus in these circumstances, device 12 may still effectively monitor for notifications even given two or more conflicting timeslot requirements.

Upon detecting an incoming notification, device 12 can alert the user to the particular personality 14 receiving a call. For example, device 12 may use a display and/or a particularly configured alert to indicate an incoming call for a particular personality 42. Also, while alerting the user to the incoming call, device 12 may continue to monitor for other incoming notifications. Thus, for example, if multiple personalities 42 receive near simultaneous notifications, device 12 can alert the user to these multiple incoming call requests. The user may then answer an incoming call request. Moreover, if multiple incoming call requests are indicated, the user may select to answer from among these without regard to the precise order in which notifications were received.

When receiving or placing a call using one registered personality 42, the use of wireless interface 30 may affect the availability of other personalities. For example, use of one personality may preclude device 12 from effectively monitoring for notifications targeting other personalities 42. In some embodiments, device 12 may rely upon service providers 14 to handle the unavailability of device 12. For example, certain service providers 14 may, upon failing to receive a timely response to a page, forward a caller into voicemail for the nonresponsive personality 42.

In other embodiments, device 12 may take steps to provide faster response during periods of unavailability. For example, device 12 may deregister with one or more personalities 42 prior to placing or receiving a call using another registered personality 42. For example, prior to placing a call using one registered personality 42, device 12 may deregister all other currently registered personalities 42. This can aid service providers 14 in more quickly responding to incoming calls. For example, instead of attempting to page device 12 for a currently unavailable personality 42, service provider 14 may immediately place a caller into voicemail for that personality 42.

Thus the illustrated device 12 and the preceding description detail potential operations to support multiple registered personalities using a single wireless device. However, while the illustration and the preceding description focus on a particular embodiment of device 12 that includes specific elements providing particular functions, system 10 contemplates device 12 having any suitable combination and arrangement of elements providing functions to support registration of multiple personalities 42 with one or more service providers 14. Thus, the functionalities performed by the particular elements illustrated may be separated or combined as appropriate. Moreover, while shown as elements of a mobile telephone, system 10 contemplates any suitable wireless equipment implementing techniques such as those described within this document. Therefore, for example, device 12 may encompass technologies such as personal digital assistants, appropriately enabled computers, or any other suitable wireless communication device. Additionally, while specific functional elements are shown within device 12, system 10 contemplates providing some or all of these functionalities using logic, such as software, encoded in media.

Figure 3:
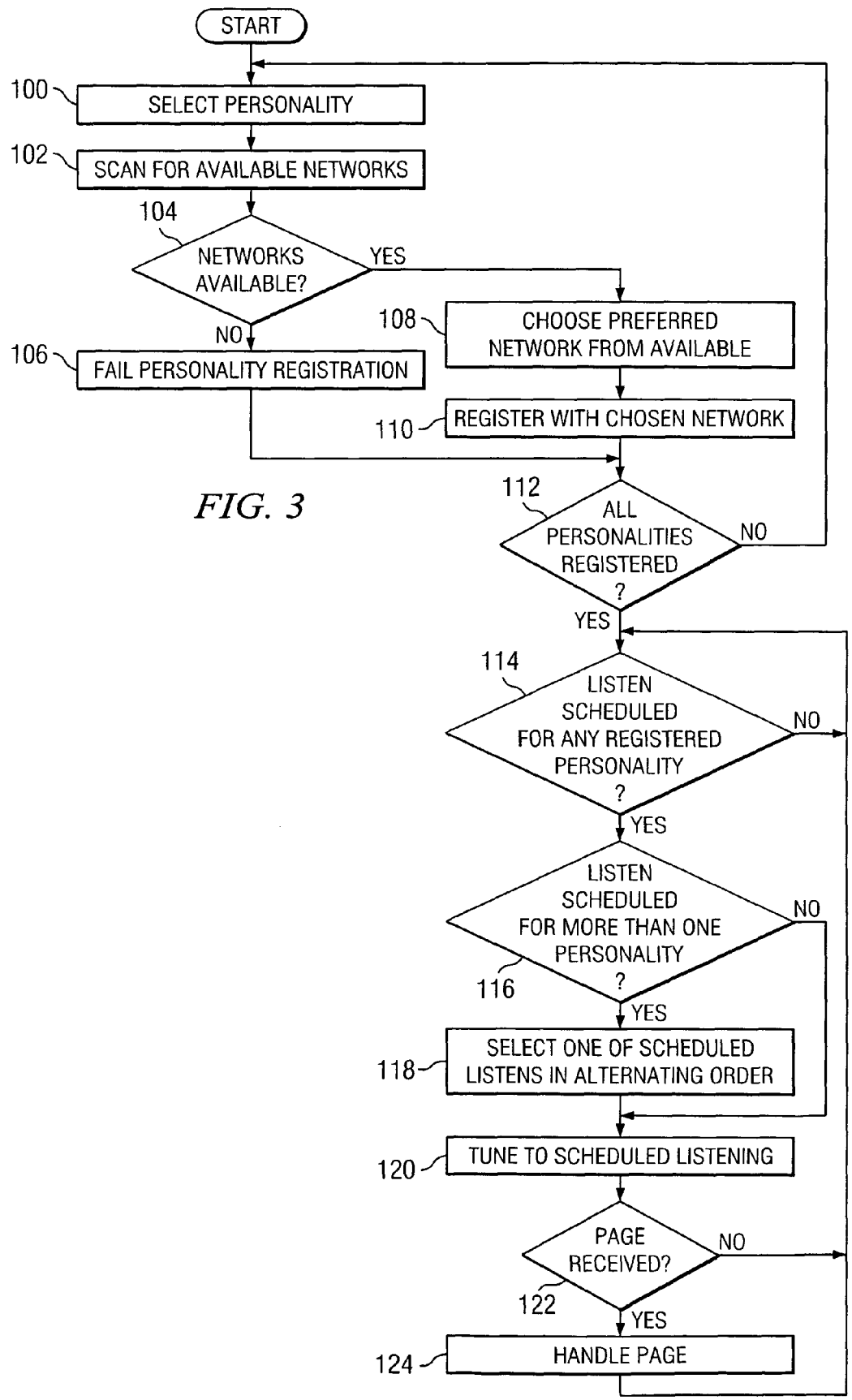
FIG. 3 is a flowchart illustrating a method for supporting simultaneous registration of multiple telephony personalities using a single set of network interface equipment.

FIG. 3 is a flowchart illustrating a method for registering multiple personalities 42 and supporting these registrations. Device 12 selects a personality at step 100. For example, controller 38 may identify active personalities 42 within memory 40 and select one of these personalities 42. Device 12 scans for available networks for the selected personality at step 102. For example, control module 38 may tune receiver 44 and transmitter 46 to various wireless channels that may support communications for the selected personality 42. In certain circumstances, device 12 may identify more than one available network for linking to service provider 14 associated with the selected personality 42. For example, device 12 may identify both a cellular and a digital communication network supported within one particular region. Device 12 chooses a preferred network from available networks at step 108 and registers with the chosen network at step 110. To choose the preferred network, device 12 may use any suitable techniques. For example, device 12 may select from available networks based on criteria such as least cost, greatest quality, and/or other suitable parameters.

If device 12 is unable to find an available network at step 104, device 12 may fail the registration of the selected personality 42 at step 106. For example, device 12 may indicate the unavailability of the selected personality 42 using a display. Moreover, while not shown in this flowchart, device 12 may mark the selected personality 42 as currently unavailable and attempt re-registration at later points, such as periodically and/or at the request of a user. After registering the selected personality 42 or failing the registration, device 12 determines whether all active personalities 42 are registered at step 112. If not, device 12 continues cycling through each active personality 42 such that device 12 attempts to register each of these personalities 42.

Device 12 monitors for incoming notifications at steps 114 through 122. More specifically, device 12 determines whether a listen is scheduled for any registered personality 42 at step 114. For example, device 12 may determine whether any of registered personalities 42 is scheduled to potentially receive notifications during a current or upcoming timeframe. If so, device 12 determines whether multiple personalities 42 conflict for the upcoming notification monitoring at step 116. If multiple personalities 42 conflict, device 12 selects one of the scheduled listens in an alternating fashion at step 118. Device 12 tunes to the scheduled listening channel at step 120 and determines whether a page has been received at step 122. If not, device 12 continues monitoring for notifications at step 114. However, upon receiving an incoming page, device 12 handles the notification at step 124. For example, as previously discussed, device 12 may provide an alert to a user using speaker 32 and/or user interface 34. Moreover, in handling the incoming notification, the user may indicate acceptance of a call and device 12 may establish and carry out communications. Thus the step of handling the notification may encompass any number of actions of device 12, including the establishment of a communication session in response to the incoming page. After the notification is handled, whether through alerts, establishment of communications, and/or other appropriate actions, device 12 returns to monitoring for pages at step 114.

Thus, the illustrated flowchart provides an exemplary method for device 12 to support registration of multiple personalities with one or more service providers 14. However, while the preceding flowchart and accompanying description illustrate a particular method for device 12 to provide these services, this provides only an exemplary method of operation. System 10 contemplates device 12 using any appropriate techniques to provide simultaneous support for multiple personality registrations. Thus, many of the steps in this flowchart may take place simultaneously and/or in different orders than as shown. In addition, device 12 may use methods with additional steps, fewer steps, and/or different steps, so long as the methods remain appropriate. For example, while not expressly illustrated, device 12 may provide for mobility between networks and/or paging areas, handling of outgoing calls from any one of the registered personalities, deregistration of one or more registered personalities prior to calls using another personality, and/or other appropriate functionalities.

In addition, as inferred previously, personalities may be customized to become active or non-active at particular times and/or places (for example, a time of day change based on user configurations). Therefore, device 12 may attempt, at appropriate times, registration or deregistration of personalities that have a change in their active state as a response to the newly active or newly inactive state. Moreover, device 12 may identify changes and perform registrations or deregistrations as an on-going process, such as by executing a background process that monitors personality states and responds accordingly. Similarly, device 12 may perform processing to handle re-attempts for previously unsuccessful registrations or deregistrations.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for accessing wireless services with a mobile device comprising:
   identifying a first personality associated with a first wireless communication service;
   detecting a first wireless network associated with the first wireless communication service;
   registering the first personality with the first wireless communication service using the first wireless network;
   identifying a second personality associated with a second wireless communication service;
   detecting a second wireless network associated with the second wireless communication service;
   registering the second personality with the second wireless communication service using the second wireless network;
   monitoring for notifications from the first wireless network that identify the first personality during one or more occurrences of a first notification interval; and
   monitoring for notifications from the second wireless network that identify the second personality during one or more occurrences of a second notification interval.

2. The method of claim 1, further comprising:
   receiving a notification of an incoming call for the first personality during at least one occurrence of the first notification interval;
   alerting a user to the incoming call in response to the notification;
   receiving an answer request from the user;
   responding to the notification; and
   establishing a voice link for the call.

3. The method of claim 2, further comprising deregistering the second personality prior to responding to the notification.

4. The method of claim 2, further comprising:
   prior to receiving the answer request from the user, receiving a second notification of a second incoming call for the second personality during at least one occurrence of the second notification interval; and
   alerting the user to the second incoming call while alerting the user to the original incoming call.

5. The method of claim 1, further comprising:
   receiving a request from a user to place a call, the request selecting one of the first personality and the second personality;
   deregistering the non-selected one of the first personality and the second personality; and
   placing a call using the selected one of the first personality and the second personality.

6. The method of claim 1, wherein the first personality comprises a first telephone number, and the second personality comprises a second telephone number different from the first telephone number.

7. The method of claim 1, wherein:
   monitoring for notifications from the first wireless network that identify the first personality during the one or more occurrences of the first notification interval comprises tuning a wireless receiver to a first wireless notification channel and listening for notifications during the one or more occurrences of the first notification interval; and
   monitoring for notifications from the second wireless network that identify the second personality during the one or more occurrences of the second notification interval comprises tuning the wireless receiver to a second wireless notification channel and listening for notifications during the one or more occurrences of the second notification interval.

8. The method of claim 7, further comprising:
   determining that the first notification interval and the second notification interval substantially conflict; and
   in response to the determination, alternating between monitoring the first wireless notification channel and the second wireless notification channel during successive occurrences of the first notification interval and the second notification interval.

9. A mobile device comprising:
   a user interface;
   a memory maintaining a first personality associated with a first wireless communication service and a second personality associated with a second wireless communication service;
   a wireless interface operable to communicate with a first wireless network associated with the first wireless communication service and to communicate with a second wireless network associated with the second wireless communication service; and
   a controller operable to register the first personality with the first wireless communication service using the first wireless network, to register the second personality with the second wireless communication service using the second wireless network, to monitor for notifications from the first wireless network that identify the first personality during one or more occurrences of a first notification interval, and to monitor for notifications from the second wireless network that identify the second personality during one or more occurrences of a second notification interval.

10. The mobile device of claim 9, wherein:
    the wireless interface is further operable to receive a notification of an incoming call for the first personality during at least one occurrence of the first notification interval;
    the user interface is operable to alert a user to the incoming call in response to the notification and to receive an answer request from the user; and
    the controller is further operable to respond to the notification using the wireless interface and to establish a voice link for the call using the wireless interface.

11. The mobile device of claim 10, wherein the controller is further operable to deregister the second personality prior to responding to the notification.

12. The mobile device of claim 10, wherein:
the wireless interface is further operable, prior to the user interface receiving the answer request from the user, to receive a second notification of a second incoming call for the second personality during at least one occurrence of the second notification interval; and
the user interface is further operable to alert the user to the second incoming call while alerting the user to the original incoming call.

13. The mobile device of claim 9, wherein:
the user interface is further operable to receive a request from a user to place a call, the request selecting one of the first personality and the second personality; and
the controller is further operable to deregister the non-selected one of the first personality and the second personality and to place a call using the selected one of the first personality and the second personality.

14. The mobile device of claim 9, wherein the first personality comprises a first telephone number, and the second personality comprises a second telephone number different from the first telephone number.

15. The mobile device of claim 9, wherein the controller is further operable to:
monitor for notifications from the first wireless network that identify the first personality during the one or more occurrences of the first notification interval by tuning a receiver of the wireless interface to a first wireless notification channel and listening for notifications during the one or more occurrences of the first notification interval; and
monitor for notifications from the second wireless network that identify the second personality during the one or more occurrences of the second notification interval by tuning the receiver of the wireless interface to a second wireless notification channel and listening for notifications during the one or more occurrences of the second notification interval.

16. The mobile device of claim 9, wherein the controller is further operable to:
determine that the first notification interval and the second notification interval substantially conflict; and
in response to the determination, to alternate between monitoring the first wireless notification channel and the second wireless notification channel during successive occurrences of the first notification interval and the second notification interval.

17. Logic for accessing wireless services with a mobile device, the logic encoded in media and operable when executed to perform the steps of:
identifying a first personality associated with a first wireless communication service;
detecting a first wireless network associated with the first wireless communication service;
registering the first personality with the first wireless communication service using the first wireless network;
identifying a second personality associated with a second wireless communication service;
detecting a second wireless network associated with the second wireless communication service;
registering the second personality with the second wireless communication service using the second wireless network;
monitoring for notifications from the first wireless network that identify the first personality during one or more occurrences of a first notification interval; and
monitoring for notifications from the second wireless network that identify the second personality during one or more occurrences of a second notification interval.

18. The logic of claim 17, further operable when executed to perform the steps of:
receiving a notification of an incoming call for the first personality during at least one occurrence of the first notification interval;
alerting a user to the incoming call in response to the notification;
receiving an answer request from the user;
responding to the notification; and
establishing a voice link for the call.

19. The logic of claim 18, further operable when executed to perform the step of deregistering the second personality prior to the step of responding to the notification.

20. The logic of claim 18, further operable when executed to perform the steps of:
prior to the step of receiving the answer request from the user, receiving a second notification of a second incoming call for the second personality during at least one occurrence of the second notification interval; and
alerting the user to the second incoming call while alerting the user to the original incoming call.

21. The logic of claim 17, further operable when executed to perform the steps of:
receiving a request from a user to place a call, the request selecting one of the first personality and the second personality;
deregistering the non-selected one of the first personality and the second personality; and
placing a call using the selected one of the first personality and the second personality.

22. The logic of claim 17, wherein the first personality comprises a first telephone number, and the second personality comprises a second telephone number different from the first telephone number.

23. The logic of claim 17, wherein:
monitoring for notifications from the first wireless network that identify the first personality during the one or more occurrences of the first notification interval comprises tuning a wireless receiver to a first wireless notification channel and listening for notifications during the one or more occurrences of the first notification interval; and
monitoring for notifications from the second wireless network that identify the second personality during the one or more occurrences of the second notification interval comprises tuning the wireless receiver to a second wireless notification channel and listening for notifications during the one or more occurrences of the second notification interval.

24. The logic of claim 17, further operable when executed to perform the steps of:
determining that the first notification interval and the second notification interval substantially conflict; and
in response to the determination, alternating between monitoring the first wireless notification channel and the second wireless notification channel during successive occurrences of the first notification interval and the second notification interval.

25. A mobile device comprising:
means for identifying a first personality associated with a first wireless communication service;
means for detecting a first wireless network associated with the first wireless communication service;

means for registering the first personality with the first wireless communication service using the first wireless network;

means for identifying a second personality associated with a second wireless communication service;

means for detecting a second wireless network associated with the second wireless communication service;

means for registering the second personality with the second wireless communication service using the second wireless network;

means for monitoring for notifications from the first wireless network that identify the first personality during one or more occurrences of a first notification interval; and means for monitoring for notifications from the second wireless network that identify the second personality during one or more occurrences of a second notification interval.

* * * * *